United States Patent [19]

Albrecht et al.

[11] Patent Number: 4,722,856
[45] Date of Patent: Feb. 2, 1988

[54] METHOD AND APPARATUS FOR DEPOSITING MONOMOLECULAR LAYERS ON A SUBSTRATE

[75] Inventors: Otto Albrecht, Torrance; Meir Bartur, Los Angeles; Vladimir Rodov, Redondo Beach, all of Calif.

[73] Assignee: Molecular Electronics Corporation, Torrance, Calif.

[21] Appl. No.: 815,512

[22] Filed: Jan. 2, 1986

[51] Int. Cl.[4] .................... B05C 3/12; B29C 39/00; B05D 1/18; B05D 1/36
[52] U.S. Cl. ........................ 427/402; 264/298; 118/402; 118/419; 427/434.3
[58] Field of Search ............... 118/402, 419; 427/402, 427/434.3; 264/298

[56] References Cited

U.S. PATENT DOCUMENTS

| | | | |
|---|---|---|---|
| 4,093,757 | 6/1978 | Barraud et al. | 118/402 X |
| 4,511,604 | 4/1985 | Barraud et al. | 118/402 X |
| 4,632,800 | 12/1986 | Barraud et al. | 118/402 X |

*Primary Examiner*—Michael R. Lusignan
*Attorney, Agent, or Firm*—Spensley Horn Jubas & Lubitz

[57] ABSTRACT

Disclosed is a method and apparatus for continuously forming and depositing a layer of monomolecular amphiphilic molecules on a substrate. The present invention includes an apparatus and method for transferring and compressing an uncompressed molecular layer from one liquid surface region to another adjacent liquid surface region by using non-moving or static mechanical components which do not come into direct contact with the monomolecular layer. The present invention is based on the fact that by continuously flowing liquid from one region to an adjacent region by using non-moving or static mechanical components that do not touch the monomolecular layer, a monomolecular layer having surprisingly little damage can be transported to the adjacent region and simultaneouly compressed by the flowing liquid surface. The monomolecular layer can then be coated onto a substrate. Due to the present invention, it is now commercially feasible to continuously supply one region with a solution of amphiphilic molecules, and then to deposit continuously onto a substrate or onto several substrates within a region in flow communication with the former region, the monomolecular layer which has been compressed and transported into this latter region.

52 Claims, 8 Drawing Figures

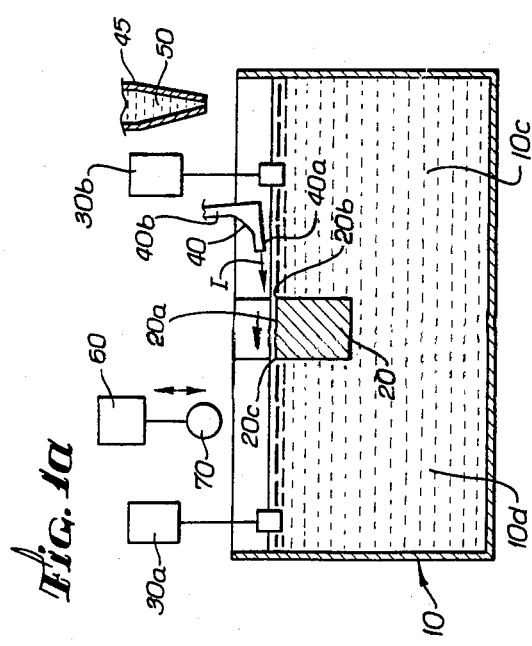

METHOD AND APPARATUS FOR DEPOSITING MONOMOLECULAR LAYERS ON A SUBSTRATE

BACKGROUND OF THE INVENTION

1. Field of the Invention

This invention relates to a method and apparatus for producing and depositing monomolecular layers on a substrate. More specifically, this invention is concerned with a practical method for continuously producing and depositing monomolecular layers onto substrates.

2. Prior Art

Monomolecular layers of organic compounds find a large number of applications, especially in the field of electronics. For example, monomolecular layers are used in forming metal-insulator-metal structures in which the thickness of the dielectric insulator layer must be controlled with a particularly high degree of accuracy.

One known method for producing and depositing monomolecular layers of amphiphilic molecules has been described by Langmuir (J. Am. Chem. Soc., Vol. 57 (1935) pp 1007-1010). Amphiphilic molecules are those having a hydrophilic end and a hydrophobic end, and line up side-by-side in a particular direction.

The Langmuir method consists of forming a monomolecular layer at the surface of a tank filled with a liquid such as water. In accordance with this method, a solution of amphiphilic molecules dissolved in a solvent which is not miscible with the liquid of the tank is spread onto the liquid surface, whereupon the solvent evaporates so that a loosely packed monomolecular layer is formed on the liquid surface. A transition of the monomolecular layer thus formed from a state of gas or liquid to a solid state is then achieved by reduction of the surface area of the layer by compressing it to a predetermined surface pressure. The resulting monomolecular layer is deposited onto the surface of a substrate by passing the substrate through the compressed layer while maintaining the layer at the predetermined surface pressure during the period of deposition.

The standard method adopted for compressing the monomolecular layer consists of using a leak-tight moving barrier which moves over the liquid surface of the tank. By displacing the barrier, the area of the monomolecular layer which had previously been formed at the liquid surface of the tank is reduced to bring the layer to the desired surface pressure. When this value is attained, the deposition operation can begin. The surface pressure of the layer is maintained at this desired surface pressure value by displacing the moving barrier so as to provide progressive compensation for the space left by the molecules which have been deposited on the substrate. On completion of the deposition operation, the moving barrier is brought back to its original position, the surface of the liquid is cleaned of the residual material and then the entire surface of the liquid is again available for the introduction of a fresh quantity of amphiphilic molecule solution.

This standard method does not readily permit continuous formation and deposition of monomolecular layers onto substrates since it is necessary to periodically replenish the bath and to compress the layer. In addition, the continuity of the compressed layer is not readily reproducible. Further, the moving barrier cause stress in some areas of the monomolecular layer, often damaging the layer.

One method for continuously producing and depositing monomolecular layers of amphiphilic molecules on solid substrates is described in U.S. Pat. Nos. 4,093,757 and 4,224,896. Specifically, the liquid surface contained in a water tank is divided into two adjacent compartments that are separated by a horizontal rotatable cylinder which is partly immersed in the liquid of the tank. A compressed monomolecular layer is formed in one of the compartments by transferring an uncompressed layer from one compartment to the adjacent compartment by imparting rotational motion to the cylinder. The rotating cylinder applies pressure to the uncompressed layer to thereby compress it to a predetermined surface pressure. The continuous production and deposition of monomolecular layer on substrates is performed by continuously introducing a solution of amphiphilic molecules into one compartment, continuously transferring the molecules from that compartment to an adjacent compartment by imparting rotational motion to the cylinder, and continuously dipping a substrate into the adjacent compartment.

Although the method described above may work conceptually, it has several disadvantages which render the method impractical for commercial applications. Specifically, the construction and material of the tank and of the cylinder that separates adjacent tank compartments, are disclosed to be highly dependent upon the desired application. In addition, frequent cleaning is required because the cylinder is coated with amphiphilic molecules. Still further, the process uses moving items (e.g., the cylinder) in contact with the monomolecular layer which cause a breakdown of the monomolecular layer as these items tend to cause stress in the liquid surface thereby ruining the continuity of the layer. The system also has sealing problems, specifically around the ends of the cylinder, thus making it difficult to achieve and maintain a predetermined monomolecular layer surface pressure.

SUMMARY OF THE INVENTION

Basic to the present invention is the fact that a film at a water surface can be compressed to a higher surface pressure and simultaneously transported by a flow at that surface, and that this flow, preferably laminar, can be generated without any moving mechanical parts in contact with the film (i.e., non-moving mechanical components such as a rotating cylinder or a floating barrier). Moving parts at the film covered surface tend to cause damage and stress to the formed layer. The present invention is based on the fact that by using a liquid surface with at least two surface regions in flow communication with each other, and preferably adjacent, where the top surface layer of the liquid contained in these regions is continuously flowing from one region to another region by using nonmoving or static mechanical components that do not contact the monomolecular layer, a monomolecular layer having surprisingly little damage can be formed in the other region and compressed by the moving liquid surface wherein the monomolecular layer can then be deposited onto a substrate. This process makes it possible to apply a predetermined surface pressure to the monomolecular layer, the value of this pressure being primarily dependent on the surface flow between each two regions. Moreover, due to the present invention, it is now commercially feasible to continuously supply a first region with a solution of amphiphilic molecules, and then to deposit continuously onto a substrate or onto several substrates within an adjacent region the monomolecular layer which has been compressed and transported into this latter region.

The present invention is specifically concerned with an apparatus and method for the practical application of monomolecular layers to a substrate which uses static mechanical means to transport and compress the molecular layers.

In one embodiment of the apparatus of the present invention, a static mechanical device such as a nozzle is used to stream gas across the surface of the liquid in the first region in the direction of the adjacent region. The stream of gas generates a flow of the top surface layer of the liquid from the first region to the adjacent region thereby compressing a monomolecular layer which had previously been spread onto the first region and transporting that compressed layer to the adjacent region. The nozzle does not come into contact with the monomolecular layer. The surface pressure of the monomolecular layer is regulated by regulating the gas stream rate.

In another embodiment of the apparatus of the present invention, a static mechanical device such as liquid conduits, for example, are attached to a tank having two adjacent regions with one conduit directing liquid into a first region at a selected flow rate and another conduit connected to the adjacent region and directing flowing liquid out of the adjacent region. Preferably, the liquid in the region in which the solution of the amphiphilic molecules is spread has a higher liquid level than the liquid level in the adjacent region within which the monomolecular layer is deposited onto a substrate. The flow of the liquid from one region to the adjacent region is thus caused by the difference between the levels of the liquid in the two regions and the fact that a continuous liquid flow is maintained. The surface pressure is regulated by selectively regulating the rate of liquid flow between adjacent regions.

In yet another embodiment of the apparatus and method of the present invention a static mechanical device comprises conduits which connect a circulation pump to the tank, the pump circulating the liquid in the tank thereby causing flow of the liquid surface.

The method for producing and depositing a monomolecular layer of amphiphilic molecules on a substrate in accordance with the present invention comprises the following steps:

(1) forming a noncompressed or loosely packed molecular layer by placing the molecules onto the surface of a liquid;

(2) applying a predetermined surface pressure to the layer thus formed, using static mechanical means and without the static mechanical means directly contacting the monomolecular layer, to thereby compress the layer and simultaneously transport the compressed layer to another surface of the liquid; and (3) depositing the transported, compressed layer onto the substrate.

In a continuous mode of the invention, the following steps take place in seriatim:

(1) moving the top liquid surface in one tank region towards the liquid surface in an adjacent tank region;

(2) continuously spreading a solution of molecules onto the liquid surface in one of the two adjacent tank regions to thereby form an uncompressed or loosely packed monomolecular layer;

(3) transporting and simultaneously compressing to a selected surface pressure the monomolecular layer by flowing the liquid surface from one region to the adjacent region, the means for transporting and compressing consisting essentially of static mechanical devices for directing sufficient force on the liquid surface in one region so that the liquid at the surface will flow to the adjacent region, the transporting and compressing means being free of mechanical contact with the monomolecular layer; and (4) continuously depositing the transported and compressed monomolecular layer onto a substrate or onto several substrates by passing the substrate through the compressed layer in the last region of the tank.

This sequence of operations permits the continuous and rapid formation and deposition of monomolecular layers of amphiphilic molecules. In addition, the construction of the apparatus of the present invention is not dependent upon the desired application of the present invention since the surface pressure of the monomolecular layer in the last region can be controlled by controlling the velocity of the top surface layer of the liquid moving between adjacent regions. Further, the continuous movement of liquid transport media reduces the need for cleaning, and there are no moving items which might cause a breakdown of the monomolecular layer. These advantages render this invention practical for commercial applications.

BRIEF DESCRIPTION OF THE DRAWINGS

A more complete understanding of the invention will be obtained from the following description which is given by the way of example without any limitations being implied, reference being made to the accompanying drawings where:

FIGS. 1a,b are a diagramatic cross-sectional view and top view, respectively, of one embodiment of the present invention wherein movement of the top surface layer of the liquid from one compartment to the adjacent compartment is generated by a stream of gas that is blown tangentially to the surface of the liquid in one compartment in the direction of the adjacent compartment.

FIGS. 2a,b are a diagramatic cross-sectional view and top view, respectively, of another embodiment of the present invention wherein movement of the surface of the liquid from one compartment to the adjacent compartment is caused by the different levels of the liquid in said two compartments and the fact that a continuous liquid flow is maintained.

DETAILED DESCRIPTION OF THE INVENTION

Figure 3A:
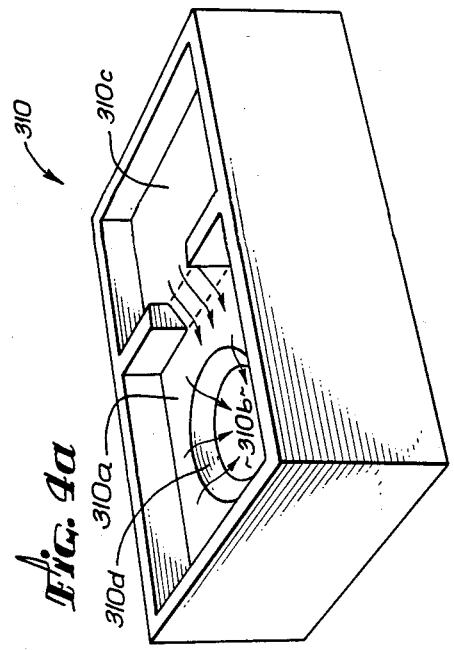
FIGS. 3a,b are a diagramatic cross-sectional view and top view, respectively, of another embodiment of the present invention particularly adapted to commercial continuous operation.

The following description is of the best presently contemplated mode of carrying out the invention. This description is made for the purpose of illustrating the general principles of the invention and is not to be taken in a limiting sense. The scope of the invention is best determined by reference to the appended claims.

FIGS. 1a,b show tank 10 filled with a liquid. Although water is the preferred liquid, any monomolecular layer transport media is within the scope of this invention. The particular liquid transport media chosen will depend upon a variety of factors including the chemical interaction of the media with the molecules forming the monomolecular layer. Means for controlling the temperature and pH of the media is also contemplated.

Horizontal barrier wall 20 having an aperture, trough or cut-out 20a extends across tank 10 between tank walls 10a,b. Barrier wall 20 divides tank 10 into two adjacent compartments 10c,d. It should be appreciated that although this embodiment (and other described below) show tank compartments separated by a barrier wall, the present invention encompasses adjacent regions on a liquid surface. Thus, any tank compartment may have more than one liquid surface region.

In the embodiment now described, the level of the liquid surface in the tank is slightly above the edges 20b,c of the aperture 20a such that the media can flow across the bottom of the aperture. It should be appreciated that the aperture 20a is preferably centrally located on a portion of the top 20d of the barrier wall; however, it can also extend across the entire barrier wall.

Each compartment is also provided with a surface pressure detector 30a,b. These detectors are of a type known to those skilled in the art and are used to measure the surface pressure of the monomolecular layer formed.

Basic to the embodiment of the present invention shown in FIGS. 1a,b is nozzle means 40 for directing a gas at the liquid surface of compartment 10c whereby the liquid surface from compartment 10c is moved to compartment 10d without using rollers or other devices having dynamic moving components and, in addition, without contacting the monomolecular layer. Nozzle means 40 having gas outlet 40a and gas inlet 40b is connected to a source of a gas stream (not shown), and is placed above the tank 10 in proximity to barrier wall 20 so as to ensure that the nozzle will direct a stream of gas tangentially to the water surface in direction "I" across the entire length of aperture 20a. It is this gas stream that moves the liquid surface from compartment 10c to compartment 10d thereby compressing and transporting a monomolecular layer deposited on the liquid surface of compartment 10c as discussed in further detail below. It should be appreciated that air is a preferred gas source; however, other gases such as nitrogen and argon are within the scope of the invention depending upon the nature of the molecules forming the monomolecular layer. It is contemplated that the gas stream may be utilized, in addition to causing flow, to react with the monomolecular layer, for example, oxidation using an oxygen source. It is also contemplated that other transport media including liquids or aerosols could be substituted for the gas. It is yet further contemplated that reactive gases or liquids can be caused to contact the monomolecular layer to modify the layer at any compartment or region, and that such additional reactants can compliment or be in addition to the flow gas.

The molecules forming the monomolecular layer initially can be stored in reservoir 45 containing a solution 50 of amphiphilic or other suitable molecules. Reservoir 45 is placed above tank 10 so that the solution can flow downwards onto the liquid surface in compartment 10c to thereby form an uncompressed (or partially compressed) monomolecular layer. It should be understood that other methods of forming the uncompressed or loosely packed monomolecular layer are within the scope of the present invention such as bringing the solution 50 to the surface of tank 10c from below the liquid surface level.

Provision is made for a suitable dipping assembly 60 above compartment 10d whereby a substrate 70 to be coated can be dipped in the liquid of compartment 10d having a compressed monomolecular layer. The dipping assembly may be of the type disclosed in U.S. Pat. No. 4,093,757 or any other suitable assembly.

The continuous production and deposition of monomolecular layers onto substrates using the embodiment discussed above and in accordance with the method of the present invention will now be described.

Nozzle means 40 continuously directs a stream of gas tangentially to the water surface across the entire apperture 20a in direction I. While tangential direction is preferred, other directions are also within the scope of the invention. The gas stream generates a continuous laminar flow of the top surface layer of the liquid from compartment 10c to compartment 10d. The level of the liquid in the tank, however, remains constant due to the free flow of water between the two compartments.

Reservoir 45 dispenses a solution 50 of amphiphilic molecules at a controlled rate onto the liquid surface in compartment 10c, whereby the solvent evaporates and whereby an uncompressed monomolecular layer is continuously being formed. The amphiphilic molecules that form the monomolecular layer adhere to the liquid surface. As a result of the continuous movement of the top surface layer of the liquid from compartment 10c into compartment 10d, the monomolecular layer is continuously transported from compartment 10c to compartment 10d. The uncompressed monomolecular layer is compressed during transport by the moving liquid surface into a compressed monomolecular layer. The surface pressure is controlled to a predetermined surface pressure by regulating the gas flow rate through the nozzle means 40.

As the monomolecular layer is being transported and thereby compressed, substrate 70 is repeatedly dipped into the liquid of compartment 10d whereby each time the substrate 70 passes through the compressed monomolecular layer, the substrate is coated with a monomolecular layer. As the monomolecular layer is deposited onto the substrate, the continuous movement of the top surface layer of the liquid from compartment 10c to compartment 10d ensures that the latter is being continuously replenished with monomolecular layer from compartment 10c and that the surface pressure of the monomolecular layer in compartment 10d is maintained constant.

The surface pressure of the monomolecular layer can be measured using surface pressure detectors 30a,b. During operation of the system, the surface pressure indicated by detector 30a is higher than the surface pressure indicated by detector 30b. Also, the surface pressure of the monomolecular layer in compartment 10d is dependent upon the velocity of the gas stream that is blown tangentially to the liquid surface. Thus it is an advantageous feature of the apparatus of the present invention that the surface pressure of the monomolecular layer in compartment 10d is readily controllable, hence the construction of the apparatus is not application-dependent.

It should be understood that while it is preferred that the region for molecule introduction, 10c, and the region for substrate coating, 10d, be adjacent, it is only essential that such regions be in flow communication with each other. Thus, one or more regions could be in between regions 10c and 10d, with or without other operations being carried out in such in between regions.

In another embodiment of the apparatus of the present invention, the movement of the top surface layer of the liquid from one compartment to an adjacent compartment is caused by continuously flowing the transport media between two adjacent compartments which have different relative surface levels of the liquid transport media. With reference to FIGS. 2a,b, tank 110 is divided into adjacent compartments 110a,b by barrier wall 120. Each compartment 110a,b is provided with a surface pressure detector 190a,b, respectively. The top 122 of barrier wall 120 includes apperture, trough or cut-out 120a having downward sloping bottom 120b and edges 120c,d. The aperture 120a may extend across a portion or the entire top of the barrier wall 120. The level of the liquid surface adjacent the aperture 120a in compartment 110a is higher than the level of the liquid surface adjacent the apperture 120a in compartment 110b thereby facilitating transport media flow.

A source of liquid (not shown) is connected to compartment 110a through a conduit 130, the flow rate of the liquid through conduit 130 being controlled by valve 130a. A drainage conduit 140 connects compartment 110b to an open reservoir 140a that is filled with liquid to its capacity. The rim 140b of the reservoir 140a, and the water level in compartment 110b, are horizontally level.

Reservoir 150 containing solution 160 of amphiphilic molecules is placed above tank 110 so that the solution can flow downwards onto the surface of the water in compartment 110a. In that portion of the tank which corresponds to compartment 110b, provision is made for a suitable dipping assembly 170 whereby a substrate 180 to be coated can be dipped in the liquid of compartment 110b having compressed monomolecular layer.

The continuous deposition using the device in accordance with this second embodiment of the present invention will now be described.

An inflow of liquid is continuously introduced into compartment 110a through conduit 130. This flow assures that the level of the water surface in compartment 110a is always slightly above edge 120c of apperture 120a so that a thin layer of water always covers the downward sloped bottom 120b. As a result, there is a continuous laminar flow of the top surface layer of the liquid from compartment 110a to compartment 110b. In the latter compartment, the level of the water surface remains constant by the virtue of the open reservoir 140a.

Reservoir 150 dispenses solution 160 of amphiphilic molecules at a controlled rate onto the surface of the liquid in compartment 110a, whereby the solvent evaporates (as noted previously), and an uncompressed monomolecular layer is continuously being formed. The amphiphilic molecules that form the monomolecular layer adhere to the liquid. Therefore, as a result of the continuous movement of the top surface layer of the liquid from compartment 110a into compartment 110b, the uncompressed monomolecular layer is continuously transported from compartment 110a to compartment 110b. The uncompressed layer is compressed by the moving liquid surface into the compressed monomolecular layer having a predetermined surface pressure. At the same time, substrate 180 is dipped in the liquid of compartment 110b whereby each time the substrate 180 passes through the compressed monomolecular layer, it is coated with a monomolecular layer. As the monomolecular layer is deposited onto the substrate, the continuous movement of the top surface layer of the liquid from compartment 110a to compartment 110b ensures that the latter is being continuously replenished with compressed monomolecular layer from compartment 110a and that the surface pressure of the monomolecular layer in compartment 110b is maintained constant.

As previously discussed with respect to the first embodiment of the apparatus of the present invention, the surface pressure of the monomolecular layer coated on the substrate can be measured using the surface pressure detectors 190a,b. It is observed that the surface pressure indicate-d by detector 190b is higher than the surface pressure indicated by detector 190a. It is also observed that the surface pressure of the monomolecular layer in compartment 110b is dependent upon the volume of liquid that is introduced into compartment 110a through conduit 130 per unit time. The more liquid that is introduced into compartment 110a per unit time, the higher the velocity of the top surface layer of the liquid and the higher is the surface pressure of the compressed monomolecular layer in compartment 110b.

For example, a solution of the amphiphilic molecule, 22-tricosenoic acid, was spread in the first compartment of a tank having three compartments where the difference between the water levels in each two adjacent compartments was approximately 0.3 inch and where the apperture slopes was 30 degrees. When the flow rate of water introduced into the first compartment was 0.6 liter per minute, the monomolecular layer in the third compartment was compressed to a surface pressure of 27 $mNm^{-1}$. When the same experiment was conducted with a flow rate of 1.4 liter per minute, the monomolecular layer was compressed to a surface pressure of 44 $mNm^{-1}$. Thus it is an advantageous feature of the device of the present invention that the surface pressure of the monomolecular layer is easily controllable. In addition, the continuous introduction of clean water into the tank eliminates the need for frequent cleaning.

While the above description covers a tank having two compartments and one sloping barrier wall cut-out, more than two compartments and one sloping barrier wall cut-out is also within the scope of the present invention.

In a third embodiment of the present invention, and with reference to FIGS. 3a,b, there is shown an alternative construction of a tank in which the movement of the top surface layer of the liquid from one compartment to an adjacent compartment is caused by liquid level differences between each of two adjacent compartments, and the fact that a continuous laminar liquid flow is maintained. Tank 200 is divided by barrier walls 210 and 220 (with apertures, troughs, or cut-outs 210a and 220a) into three compartments 200a,b,c. The tank is filled with a liquid, such as water, such that the level of the liquid surface in compartment 200a is higher than the level of the liquid surface in compartment 200b and the level of the liquid surface in compartment 200b is higher than the level of the liquid surface in compartment 200c. A source of liquid is connected to compartment 200a through a conduit 230 and the rate of liquid flow through the conduit 230 controlled by valve 230a. A drainage conduit 240 connects compartment 200c to an open reservoir 250 that is filled with liquid to its capacity. The rim 250a of the reservoir 250, and the water level in compartment 200c, are at the same level. A bypass conduit 260 with a valve 260a connects compartments 200a and 200b, and a bypass conduit 270 with a valve 270a connects compartments 200b and 200c.

In this third embodiment of the present invention, the velocity of the top surface layer of the liquid moving from compartment 200a to compartment 200b through apperture 210a is dependent not only upon the quantity of liquid that is introduced into compartment 200a through conduit 230 per unit time, but also on the leakage through bypass conduit 260 that valve 260a allows. Similarly, the velocity of the top surface layer of the water from compartment 200b to compartment 200c through apperture 220a is dependent upon the leakage through bypass conduit 270 that valve 270a allows. Since the difference between the surface pressures of the monomolecular layer in two adjacent compartments is dependent upon the velocity of the top surface layer between said two compartment, it is an advantageous feature of this construction that it permits the surface pressure of the monomolecular layer in the last compartment as well as the control of the differences between the surface pressures of the monomolecular layer in each two adjacent compartments.

Although the third embodiment discussed above provides an excellent continuous system, it has been found that some breakdown in the monomolecular layer in compartment 200c is seen. The source of this problem was that the velocity of the liquid is lower at the corners of the chute 220a thereby creating some turbulence in the liquid. The turbulence in turn squeezes the compressed monomolecular layer causing it to break down, especially at higher surface pressures where the film is a solid.

Figure 4A:
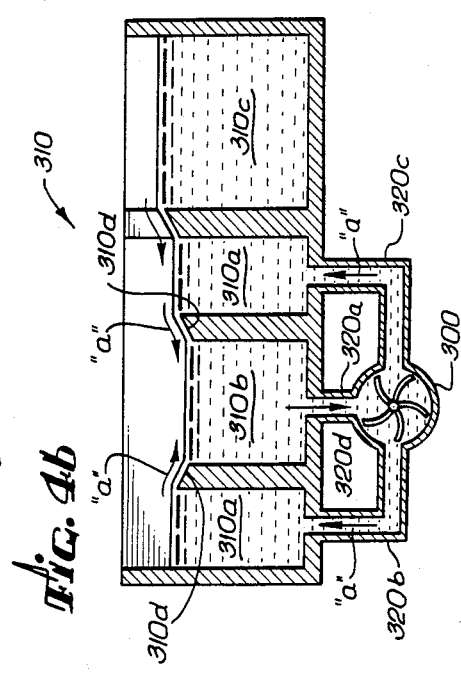
FIGS. 4a,b are a diagrammatic perspective top view and vertical cross-sectional view, respectively, of another embodiment of the present invention wherein a pump is used to generate and control the transport media flow.
Figure 3B:
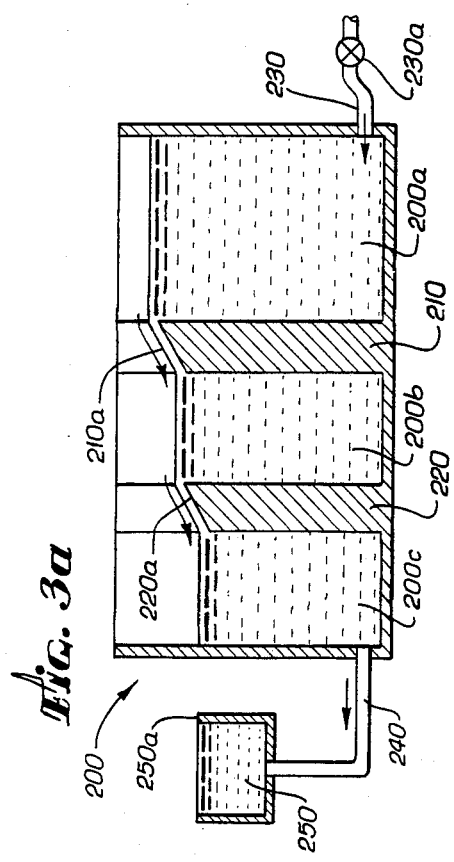
Figure 4B:
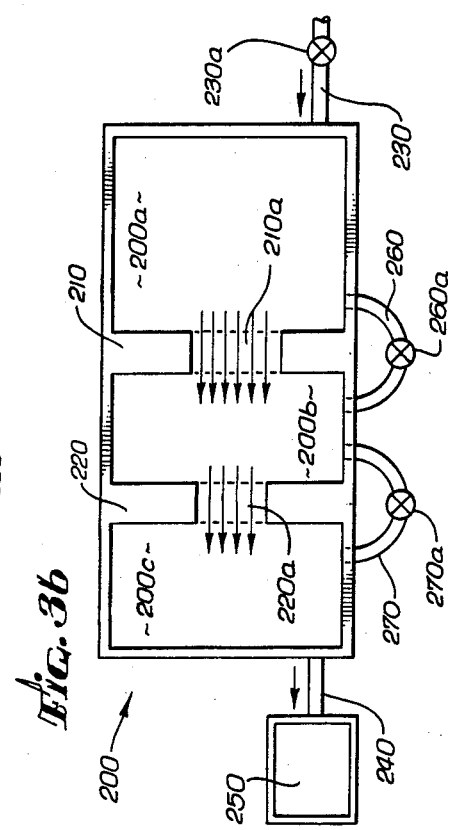

To avoid the problem noted above, and with reference to FIGS. 4a,b, a fourth embodiment of the apparatus and method of the present invention includes static mechanical means comprising a continuous chute within the last compartment, and preferably further comprising conduits which connect a circulation pump to the tank thereby circulating the liquid in the tank to cause laminar flow of the liquid surface. In a preferred construction, a pump 300 is supported outside the lower portion of the tank 310 and connected by conduits 320b,c to compartment 310a which is designed as a continuous chute around compartment 310b. It is in compartment 310b that the compressed monomolecular layer films are deposited onto a substrate. The water flows in the direction indicated by arrows "a", i.e., the pump 300 pulls the transport liquid through conduit 320a and out of compartment 310b, and pushes the transport liquid through conduits 320b,c and into the compartment 310a which is separated from compartment 310b by continuous chute 310d. In the particular embodiment illustrated, the drainage opening 320d is in the bottom of the (n)th compartment of a tank having a series of n compartments. In the embodiment illustrated, the (n−2)th compartment 310c receives the monomolecular layer solution. The flow between this n−2nd and n−1st compartment is maintained by one of the previously described methods.

It should be appreciated that more than three compartments are contemplated as being within the scope of the invention. For example, another version of the fourth embodiment of the present invention uses three compartments or surface regions before the film is finally compressed in the compartment having the ring shaped chute. Preferably, the barrier wall separating compartments 310a and 310c has an aperture as discussed above with respect to barrier wall 20 and uses the embodiment of FIG. 1 to transport and compress the film. The flow rate into compartment 310b and thus the surface pressure there, can be regulated by regulating the pump output. As a result of this construction, there is maximum material transport at the fastest possible speed, there is uniform velocity distribution (that is, no edges where the surface of velocity drops to zero), and there is the least chance for turbulence at the water surface. Variations of this embodiment are numerous. For example, the number of conduits and the shape of their openings can be varied to achieve more accurate flow rate regulation. Moreover, any tank compartment can be divided into a number of regions wherein either different monomolecular layers of different molecules are deposited or where there are multiple coatings applied to a substrate, or mixtures of both.

It should further be appreciated that the present invention contemplates an apparatus and method also including means for controlling the temperature of the transport liquid, means for controlling the pH of the liquid, means for adding additives to any of the liquid compartments or regions, and the use of mixtures of molecules, both amphiphilic and others.

It should also be appreciated that it is not necessary that a tank divided into compartments by barrier walls be used. In its most basic embodiment, the present invention comprises a flow of liquid at the liquid surface, where at a first region of the flowing liquid surface, the monomolecular layer molecules are deposited, and at a second region of the flowing liquid surface, a substrate is put into contact with the monomolecular layer which had been compressed and simultaneously transported by the liquid flow from the first region to the second region.

It should finally be appreciated and emphasized that the present invention is broad in scope and that variations will occur to those of skill in the art, and that such variations are within the scope of the present invention.

I claim:

1. A device for forming and depositing a layer of molecules on a substrate, including:
    a tank for containing a liquid, the surface of the liquid having first and second liquid surface regions;
    gas application means for applying a stream of gas to the liquid surface so that the liquid from the first region flows into the second region; and
    means for applying a solution of molecules to the first region,
    whereby the liquid flow transports to, and compresses the molecules on, the second liquid surface region.

2. A device according to claim 1 wherein the gas application means applies the stream of gas tangentially to the surface of the liquid in the first region of the tank.

3. A device according to claim 2 wherein the gas application means comprises a nozzle having a gas outlet disposed tangential to the surface of the liquid.

4. A device according to claim 2 wherein the gas is selected from the group consisting of air, nitrogen, argon, oxygen or mixtures thereof.

5. A device according to claim 1 wherein the tank has a rectangular horizontal cross-section and where a barrier wall extends between opposite sides of the tank and divides the liquid surface in the tank into the two regions.

6. A device according to claim 5 wherein a top portion of the barrier wall has an aperture extending perpendicular to the direction of extension of the barrier wall.

7. A device according to claim 1 wherein there is more than one barrier wall and more than two regions in the tank.

8. A device according to claim 7 wherein the gas application means consists of a nozzles.

9. A method for continuously forming a layer of molecules on a liquid-gas surface and for compressing that layer to a suitable pressure for subsequent deposition onto solid objects including:
the step of continuously flowing the liquid at the surface from one liquid surface region to another liquid surface region without using moving parts in contact with the surface.

10. A method according to claim 9 wherein there are more than two regions of continuously flowing liquid and where the compression to a final desired pressure is achieved after the molecules are flowed by the continuously flowing liquid over said more than two regions.

11. A method according to claim 10 where a jet stream emanating from below the surface generates the surface flow velocity.

12. A method according to claim 10 where the two regions are at different relative height levels and where gravity generates the surface flow velocity between the two regions.

13. A method according to claim 10 where a jet stream emanating from above the surface generates the flow between the surface regions.

14. A device for continuously producing and depositing a layer of molecules onto a substrate, including:
a tank containing a liquid and a barrier wall, the liquid surface divided by the barrier wall into first and second compartments;
means for delivering the molecules onto the liquid surface of the first compartment thereby forming a layer of molecules;
means for transferring the layer of molecules from the first compartment to the second compartment and simultaneously compressing the layer, the transfer means consisting essentially of a gas nozzle having a gas outlet which is disposed adjacent the barrier wall so that the gas flows tangential to the liquid surface in one compartment in the direction of the second compartment; and
means for bringing a substrate to be coated with a layer of molecules into contact with a molecular layer transferred by the transfer means.

15. A device according to claim 14 wherein the molecules are amphiphilic.

16. A device for continuously producing and depositing a monomolecular layer of amphiphilic molecules onto a substrate, the device including:
a tank for containing a liquid;
a barrier wall dividing the tank into first and second zones, the barrier wall having an inclined top surface portion whereby the level of the liquid surface in the first zone adjacent the top surface portion is higher than the level of the liquid surface in the second zone adjacent the top surface portion;
means for supplying liquid into the first zone at a predetermined selected flow rate to establish a level in the second zone at the bottom of the incline;
means for draining liquid from the second zone; and
means for generating a layer of amphiphilic molecules on the liquid surface of the first zone.

17. A device according to claim 16 wherein the means for generating a layer of amphiphilic molecules includes a liquid molecule solution receptacle adapted for delivering the solution at a controlled rate onto the liquid surface from above or below the first compartment.

18. A device according to claim 17 further including means for bringing a substrate into contact with the molecular layer disposed on the liquid surface in the second compartment.

19. A device for continuously forming and depositing a layer of amphiphilic molecules on a substrate, including:
a tank for containing a liquid;
at least two barrier walls, each extending across opposite sides of the tank so as to divide the tank into three compartments, each barrier wall having a top surface portion inclined such that the liquid surface level adjacent the top surface portion is different with respect to adjacent tank compartments;
means for introducing a liquid into a first compartment at one end of the tank at a predetermined selectable flow rate; and
means for draining the third compartment located at the other end of the tank.

20. A device according to claim 19 wherein the means for draining includes a conduit connected at one end to said second tank compartment and at the other end to an open reservoir having an upper rim, the rim being horizontally level with the water level in said second compartment.

21. An apparatus for transporting and compressing monomolecular layers including:
a liquid holding tank having two adjacent liquid surface regions;
means for establishing the flow of the liquid surface unidirectionally from one region to the other region.

22. An apparatus according to claim 21 wherein the two adjacent regions are separated by a barrier wall having a cut-out, the bottom of the cut-out sloped towards the adjacent region.

23. An apparatus according to claim 22 wherein the static mechanical means consists of a conduit connected to the tank and disposed so that liquid passing through the conduit is directed toward the barrier wall.

24. An apparatus according to claim 22 wherein the static mechanical means consists of a gas nozzle disposed so that the gas outflow is directed generally tangential to the liquid surface in the one region.

25. A method for continuously forming and depositing a layer of monomolecular amphiphilic molecules on a substrate including the following steps:
filling a tank with a liquid transport media, the tank being divided by a barrier wall into at least two compartments, a portion of the top surface of the barrier wall being adapted to allow flow of the liquid transport media across said top surface portion;
generating a laminar flow of the liquid transport media surface across said top surface portion of the barrier wall;
delivering, at a predetermined rate, a solution of amphiphilic molecules to be coated onto a substrate to the liquid surface of the first compartment of the tank containing the liquid transport media; and coating the substrate to be coated with the monomolecular layer in the second compartment of said tank.

26. A method according to claim 25 wherein the amphiphilic molecules consist essentially of 22-tricosenoic acid.

27. A method according to claim 25 wherein the gas is one selected from the group consisting of nitrogen, argon, air and mixtures thereof.

28. A method for continuously forming and depositing a layer of molecules on a substrate, including:
flowing a liquid transport media at a selectable, predetermined rate across an inclined top surface portion of a barrier wall;
delivering, at a predetermined rate, a solution of molecules to be coated on a substrate to the liquid surface of a first region of the tank containing the liquid transport media; and
coating the substrate with the monomolecular layer in a second region of said tank.

29. A method for producing and depositing a monomolecular layer of molecules on a substrate, including:
a first step of forming an uncompressed molecular layer on a liquid surface; and
a second step of application of surface pressure to the layer thus formed solely by flowing the liquid surface bearing said molecular layer from a first tank region to a second tank region,
wherein the flow of the liquid transport media alone transfers the molecules of the monomolecular layer from one region to the other region and compresses the monomolecular layer.

30. A method according to claim 29 wherein the molecules are amphiphilic.

31. A method according to claim 30 further including a third step of transferring the compressed layer in the second tank region to a substrate.

32. A device for forming and depositing a layer of molecules onto a substrate, including:
a tank for containing a liquid;
a barrier wall separating the tank into first and second compartments, the barrier wall having a top surface configured so that liquid can flow from the first compartment across at least a portion of the top surface of the barrier wall into the second compartment; and
pump means for circulating the liquid between the compartments.

33. A device according to the claim 32 wherein the first compartment surrounds the second compartment.

34. A device according to claim 33 wherein a portion of the top surface of the barrier wall is sloped towards the second compartment thereby forming a continuous chute.

35. A device for continuously producing and depositing a monomolecular layer of amphiphilic molecules onto a substrate, including:
a tank for containing a liquid and divided by a barrier wall into at least first and second adjacent compartments;
means for delivering the molecules onto a portion of the liquid surface of the tank thereby forming a layer of uncompressed molecules;
transfer means for transferring the layer of molecules to the first compartment and from the first compartment to the second compartment, the transfer means consisting essentially of flowing liquid and conduits, one conduit communicating with the first compartment and another conduit communicating with the second compartment; and
a circulation pump for causing the liquid flow,
wherein the liquid flows from the second compartment through the one conduit and is pumped through said another conduit into the first compartment.

36. A device according to claim 33 wherein there are n compartments in the tank and wherein the first compartment is the (n−1)th compartment.

37. A device according to claim 35 further including a continuous chute, and wherein the first and second compartments are separated by the continuous chute.

38. A device according to claim 37 wherein the tank contains a third compartment adjacent the first compartment and a fourth compartment adjacent the third compartment and wherein the delivering means delivers the molecules onto the surface of the liquid in the fourth compartment.

39. A method for continuously forming and depositing a monomolecular layer of amphiphilic molecules on a substrate including the following steps:
filling a tank with a liquid transport media, the tank being divided by barrier walls into first, second, third and fourth compartments, the barrier wall between first and second compartment being a continuous chute surrounding the first compartment, a portion of the top surface of the other barrier walls being adapted to allow flow of the liquid transport media across said top surface portion;
causing a laminar flow of the liquid transport media from the fourth compartment into the third, from there into the second compartment, and from the second compartment into the first compartment, the laminar flow being generated by a circulation pump;
delivering, at a controlled rate, a solution of amphiphilic molecules to be coated onto a substrate to the liquid surface of the fourth compartment of the tank containing the liquid transport media; and
dipping a substrate to be coated with the monomolecular layer into the second compartment of said tank.

40. A method according to claim 38 wherein the amphiphilic molecules consist essentially of 22-tricosenoic acid.

41. A method according to claim 29 wherein the liquid surface is caused to flow by a circulation pump operatively connected to the first and second compartments of the tank.

42. An apparatus for forming a compressed monomolecular layer for application to an article, including:
a barrier wall separating, at least at the surface, first and second liquid containing zones of said apparatus,
laminar flow creating means for establishing a laminar flow gradient across at least a portion of said barrier wall from said first zone to said second zone, and
means for forming a molecular layer atop said liquid in said first zone, said laminar flow creating said formed layer to be transported across said barrier wall, thereby to create a compressed molecular layer atop the liquid in said second zone.

43. A device according to claim 21 further including means for controlling the liquid temperature, means for controlling the liquid pH, and means for controlling the addition of other additives to the liquid surface.

44. A device according to claim 1, wherein the molecules consist of one or a mixture of amphiphilic molecules.

45. A method according to claim 9 wherein the continuous flow is a steady flow.

46. A method for continuously forming a layer of molecules on a liquid-liquid interface and for compressing that layer to a suitable pressure for subsequent deposition onto solid objects including the step of continuously flowing the liquid at the liquid-liquid interface from one liquid-liquid interface region to another liquid-liquid interface region without using moving parts in contact with the interface.

47. A method according to claim 46 wherein the continuous flow is a steady flow.

48. A method according to claim 46 where there are more than two regions of continuously flowing liquid and where the compression to a final desired pressure is achieved after the molecules are flowed by the continuously flowing liquid over said more than two regions.

49. A method according to claim 46 wherein a jet stream emanating from below the interface generates the interface flow velocity.

50. A method according to claim 46 wherein gravity generates the interface flow velocity between the two regions.

51. A method according to claim 46 where a jet stream emanating from above the interface generates the flow between the interface regions.

52. A device for continuously forming and depositing a layer of molecules on a substrate, the device including:
 a tank for containing a liquid, the tank having two adjacent liquid regions, a portion of the interior surface of the bottom of the tank being inclined from one of said liquid regions toward the other of said liquid regions;
 means for continuously flowing a liquid into the tank at a selectable flow rate; and
 means for continuously depositing the molecules onto the surface of the liquid in one of said liquid regions.

* * * * *